(12) United States Patent
Evans

(10) Patent No.: US 10,191,610 B2
(45) Date of Patent: Jan. 29, 2019

(54) IMPLEMENTING FOCUS INDICATION OF COMPONENTS DISPLAYED ON A DISPLAY DEVICE

(71) Applicant: Oracle International Corporation, Redwood Shores, CA (US)

(72) Inventor: James Evans, Burlington, MA (US)

(73) Assignee: Oracle International Corporation, Redwood Shores, CA (US)

(*) Notice: Subject to any disclaimer, the term of this patent is extended or adjusted under 35 U.S.C. 154(b) by 222 days.

(21) Appl. No.: 15/241,882

(22) Filed: Aug. 19, 2016

(65) Prior Publication Data

US 2018/0052581 A1   Feb. 22, 2018

(51) Int. Cl.
| | | |
|---|---|---|
| G06F 3/0354 | (2013.01) | |
| G06F 3/0481 | (2013.01) | |
| G06F 3/0482 | (2013.01) | |
| G06F 3/0484 | (2013.01) | |
| G06F 3/0489 | (2013.01) | |

(52) U.S. Cl.
CPC ...... *G06F 3/04812* (2013.01); *G06F 3/03543* (2013.01); *G06F 3/0482* (2013.01); *G06F 3/04817* (2013.01); *G06F 3/04842* (2013.01); *G06F 3/04892* (2013.01)

(58) Field of Classification Search
CPC .......................... G06F 3/0482; G06F 3/04855
USPC ......................................... 715/761–765, 702
See application file for complete search history.

(56) References Cited

U.S. PATENT DOCUMENTS

| | | | |
|---|---|---|---|
| 2006/0246955 A1* | 11/2006 | Nirhamo .............. | G06F 3/0482 455/566 |
| 2015/0058723 A1* | 2/2015 | Cieplinski .......... | G06F 3/04855 715/702 |

* cited by examiner

*Primary Examiner* — Cao H Nguyen
(74) *Attorney, Agent, or Firm* — Trellis IP Law Group, PC

(57) ABSTRACT

Focus indication is implemented for components displayed on a display device. A first signal is accepted from a first user input device to change focus to a first selected component on the display device. A focus indicator is provided in association with the first selected component in response to the first signal. A second signal is accepted from a mouse or touch user input device to change focus to a second selected component. A determination is made that focus has changed in response to an input from the mouse or touch user input device. Display of the focus indicator is suppressed for the second selected component in response to the determining.

20 Claims, 13 Drawing Sheets

FIGURE 1A
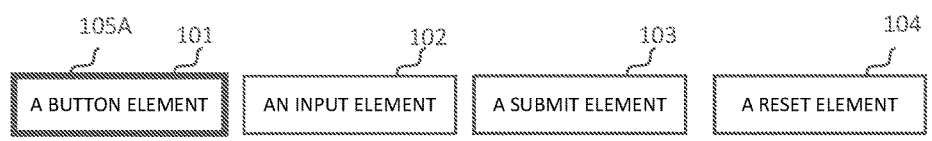
FIGURE 1B
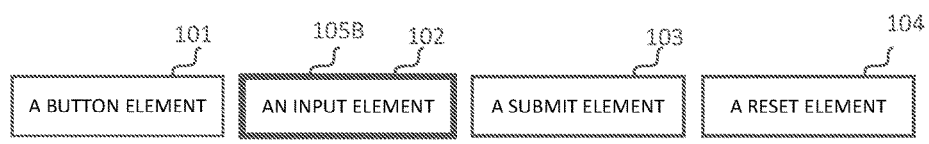
FIGURE 1C – PRIOR ART
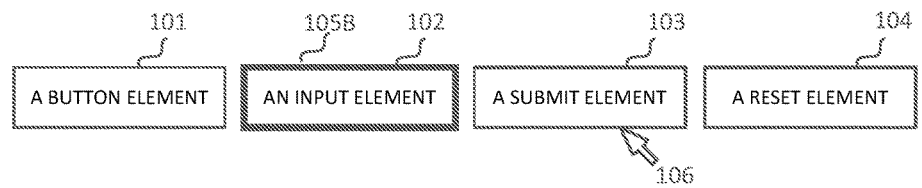

FIGURE 1D – PRIOR ART
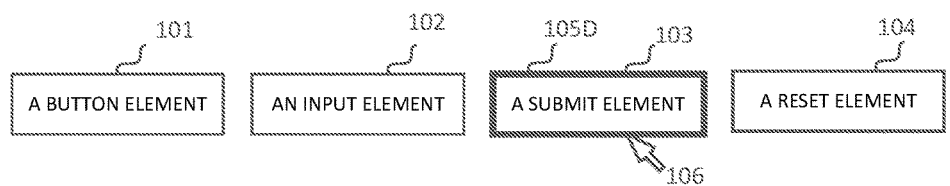
FIGURE 1E
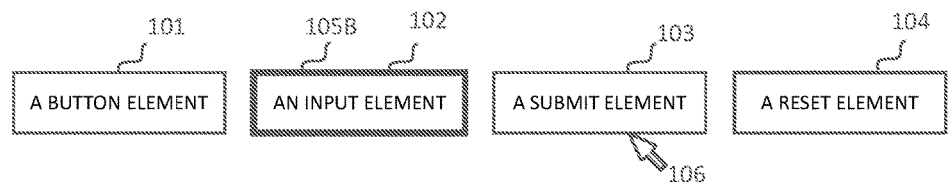

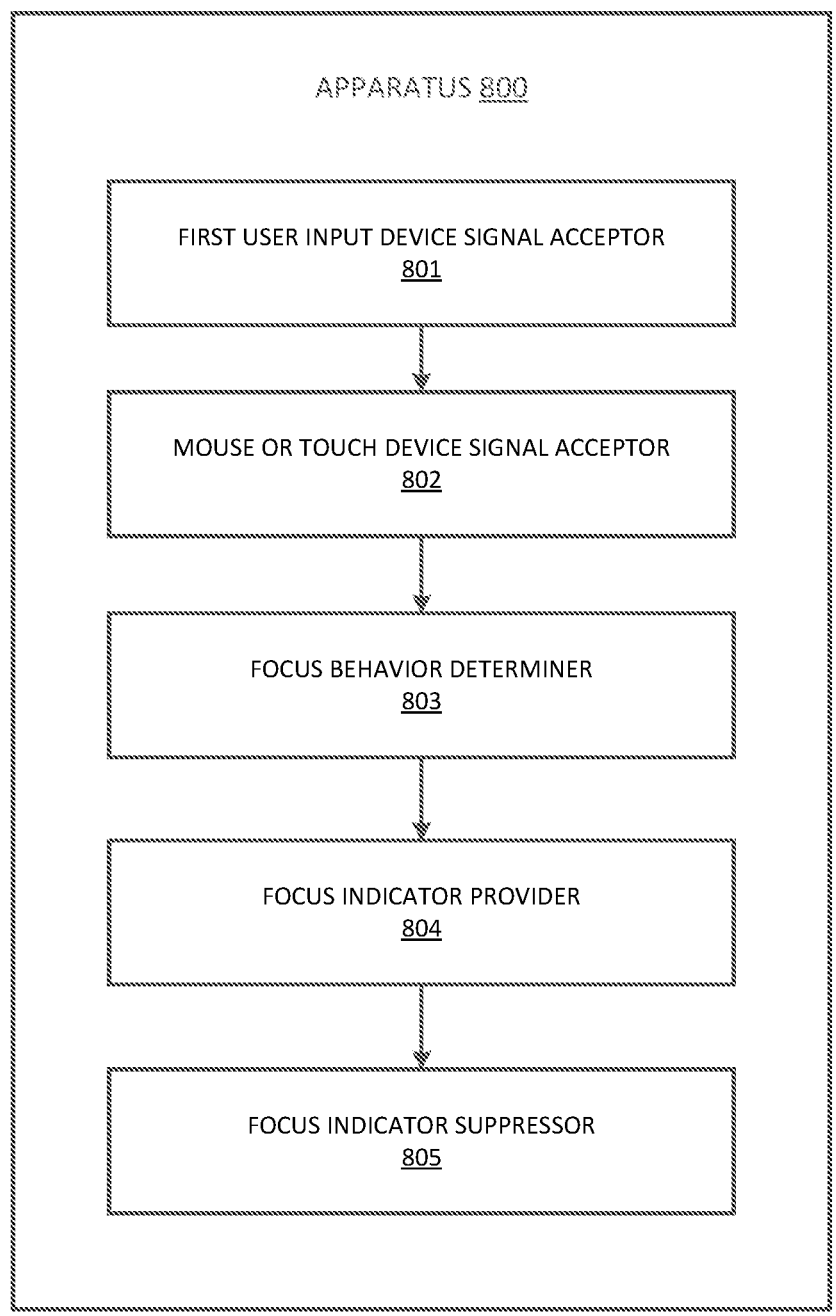

IMPLEMENTING FOCUS INDICATION OF COMPONENTS DISPLAYED ON A DISPLAY DEVICE

BACKGROUND

In a graphical user interface (GUI) the "focus" indicates the component of the GUI which is selected to receive input. For example, text entered at a keyboard, or a button press on a user input device such as the "enter" button on the keyboard or a tap on a trackpad, results in an input event that is sent to the component which has the focus. Examples of components include buttons, drop down menus, menu buttons, radio buttons, check boxes, data entry fields, etc.

A focus indicator, such as a highlight or box, on or around the selected component enables the user to easily determine which component is currently selected. However, in some situations, such as when the user is providing input commands using a mouse device or a touch screen, a focus indicator is not needed and can detract from the overall presentation and clarity of components and other information being displayed.

SUMMARY

A focus indicator is turned off, disabled, or otherwise suppressed from display when it is determined that the indicator is most likely not needed. In particular embodiments, the focus indicator is turned off when a user changes focus using a touchscreen or mouse types of devices. Particular embodiments can time the interval between a change focus event and a mouse or touchscreen event in order to determine what type of user input caused a focus change.

Focus indication is implemented for components displayed on a display device. A first signal is accepted from a first user input device to change focus to a first selected component on the display device. A focus indicator is provided in association with the first selected component in response to the first signal. A second signal is accepted from a mouse or touch user input device to change focus to a second selected component. A determination is made that focus has changed in response to an input from a mouse or touch user input device. Display of the focus indicator is suppressed for the second selected component in response to the determining.

A further understanding of the nature and the advantages of particular embodiments disclosed herein may be realized by reference of the remaining portions of the specification and the attached drawings.

BRIEF DESCRIPTION OF THE DRAWINGS

FIGS. 1A, 1B depict components and focus indicator behavior, according to various embodiments.

FIGS. 1C and 1D depict prior art focus behavior.

FIGS. 1E-1M depict components and focus indicator behavior, according to various embodiments.

FIG. 8 depicts a block diagram of an apparatus for of implementing focus indication of components displayed on a display device, according to one embodiment.

DETAILED DESCRIPTION OF EMBODIMENTS

Overview of Discussion

Figure 1F:
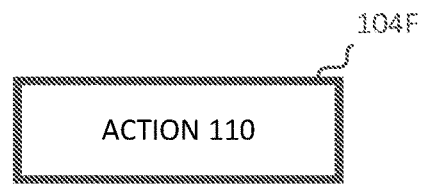

In certain situations, a user relies on the focus indicator to know what component on a page of a graphical user interface (GUI) will receive input. For example, when arrow keys or tab keys of a keyboard are used to select components, the cursor can be on a different component than what the user thinks it is on because the user may have accidentally pressed a key more times than they thought or accidentally pressed a different key than they intended. Associating a focus indicator on the selected component helps the user to know which component was selected.

However, in other situations, the user does not need the focus indicator to know what component they selected for input. For example, if the user touches the displayed component or uses their mouse to select the displayed component, then there is a high probability that the user knows which component was selected. Further, the focus indicator may be a distraction and/or unnecessary for certain types of situations. For example, focus indicators are considered a distraction, unnecessary clutter and/or ugly for mobile applications.

At any given time, at most one component on a page has focus. According to one embodiment, the focused component is the one that the user has currently selected. Typically, the focus indicator is a ring, outline, box, rectangle or frame that is around the component, such as a heavy blue or yellow outline, bolding, or a pattern around the component, such as a dotted outline. However, the focus indicator could be a background color or other visual indication, such as highlight, font change, or animation. The focus indicator may be inside or outside of the component. The focus indicator can be positioned differently. For example, the focus indicator may be around the edges of the component or the interior of the component may be a certain color or shade. The focus indicator can be a ring, an outline, box or frame that is, for example, around the edges of the component. A focus indicator could have two or more features including color, pattern, background, and placement, among other things. For example, a focus indicator could have a ring or frame around a component, a shade inside of the component. Further, the shade inside of the component could be colored. By combining two or more features, such as a ring, shading and so on, the component can be given additional visual emphasis. The type of focus indicator can be browser dependent. In other words, different types of browsers may use different types of focus indicators.

FIGS. 1A-1E each depict four components which are different types of buttons 101-104 that provide various types of controls. The buttons 101-104 respectively are labeled with text "a button element," "an input button," "a submit button," and "a reset button," indicating the type of control that the respective button provides.

FIG. 1A depicts the focus indicator 105A applied to button 101, according to one embodiment. When the user presses the right arrow or the tab key, the cursor is moved from button 101 to button 102, the focus indicator 105A is removed from button 101 and a focus indicator 105B is applied to button 102, as depicted in FIG. 1B.

FIG. 1C depicts processing in the prior art when the user switches to using their mouse to move the cursor 106 from button 102, depicted in FIG. 1B, to button 103, as depicted in FIG. 1C. A cursor 106 is also referred to as a "mouse pointer." As the cursor 106 is hovering over button 103, the focus indicator 105B remains on button 102 as depicted in FIG. 1C.

FIG. 1D depicts prior art processing when the user clicks on button 103 using their mouse. The cursor 106 is still located at button 103, the focus indicator 105B is removed from button 102, as depicted in FIG. 1C, and a focus indicator 105D is applied to button 103, as depicted in FIG. 1D.

FIG. 1E depicts processing that is provided according to various embodiments instead of prior art processing depicted in FIGS. 1C and 1D. Assume that the user had selected button 102, using the keyboard as discussed herein, and that the focus indicator 105B was applied to button 102, as depicted in FIG. 1B. Referring now to FIG. 1E, when the user switches to using their mouse to hover the cursor 106 over button 103, the focus indicator 105B remains on button 102. A focus indicator is not applied to button 103 while the cursor 106 is hovering over button 103, according to one embodiment. Further, as depicted in FIG. 1E, when button 103 is selected by clicking on button 103 using the mouse or by touching the button 103 with a finger, the focus indicator 105B would be removed from button 102 and a focus indicator would not be applied to button 103, according to various embodiments.

FIGS. 1F-1M depict components, according to various embodiments. For example, FIGS. 1F-1M depict a menu button 110. FIGS. 1G, 1I-1L also depicts a menu 120 and corresponding selectable menu options 120A-120D in addition to the menu button 110. The menu button 110 is an example of a component that also provides selectable menu options 120A-120D.

Menu button 110 is labeled "Actions" indicating that the menu button 110 provides an action control. Menu option 120A-120D are respectively labeled with text "zoom in," "zoom out," "save," and "print" indicating the type of control that the button provides.

Figure 1G:
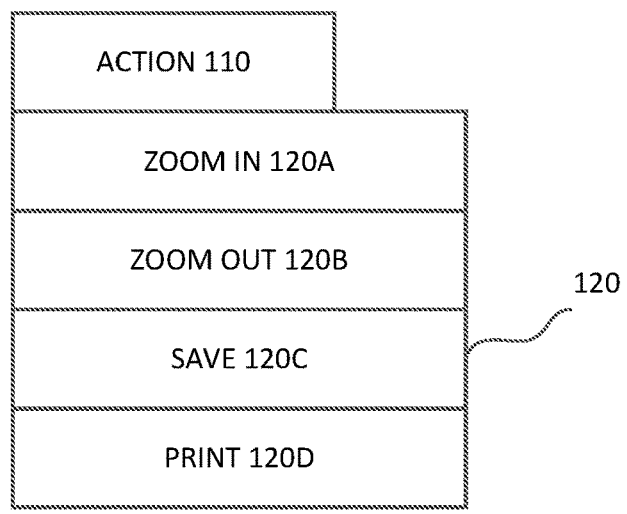
Figure 1H:
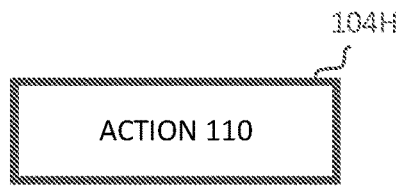

FIGS. 1F-1M depicts the appearance of the menu button 110 during a series of user interactions with it. For example, FIG. 1F depicts the menu button 110 upon initial load of the page. An application can choose when focus occurs and whether to apply a focus indicator during page load so that a keyboard user (or a user not using mouse or touch) knows where they are starting from. According to one embodiment, a focus indicator is applied to one of a page's components that is focused upon page loaded. Thus, a user who is not using mouse or touch will know where they are starting from. For the sake of illustration, assume that menu button 110, as depicted in FIG. 1F, is the component that the focus indicator 104F is applied to during page load. FIG. 1G depicts the menu button 110 after a user selects the menu button 110 using mouse or touch which results in the menu 120 being displayed. FIG. 1H depicts the menu button 110 after the keyboard's enter key has been pressed, for example, while one of the menu options 120A-120D is selected.

According to one embodiment, if mouse or touch are used to select any of the items 110, 120A-120D, a focus indicator is not applied to the selected items. For example, assume that the user selects action 110 using a mouse or touch after initial page load causing the menu 120 to be displayed. The components 110, 120A-120D will appear as depicted in FIG. 1G. Further, assume that the user continues to use mouse or touch to select one or more of the components 110, 120A-120D in any order. In this case, focus indicators will not be applied to the selected components 110, 120A-120D as depicted in FIG. 1G. If the user presses the keyboard's enter key while menu 120 is displayed, the menu 120 disappears and a focus indicator 104H is applied to the menu button 110, as depicted in FIG. 1H.

Figure 1I:
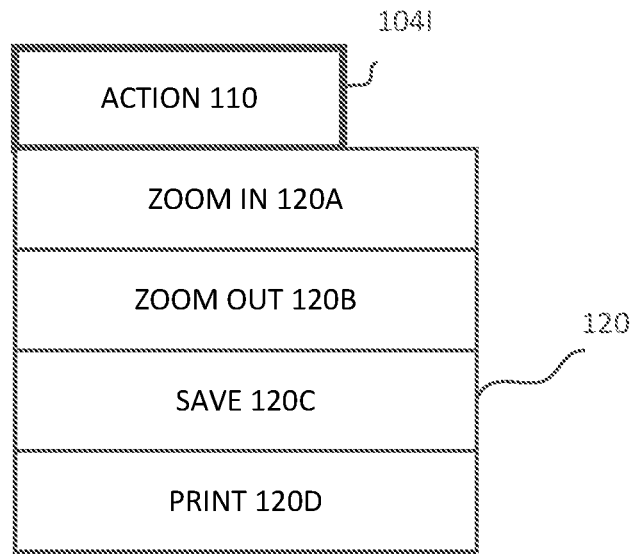
Figure 1J:
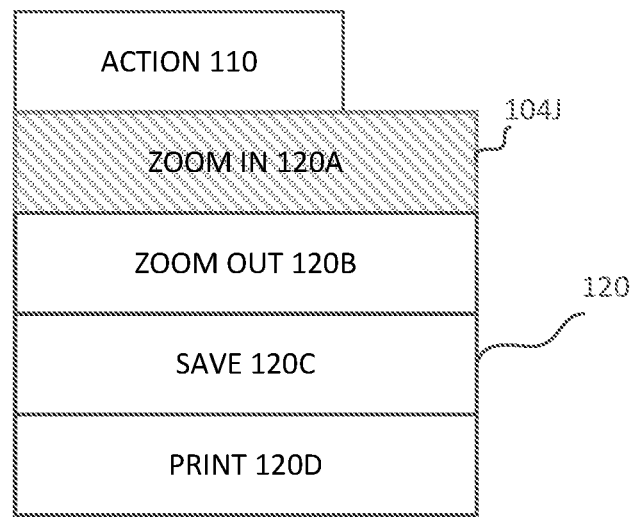
Figure 1K:
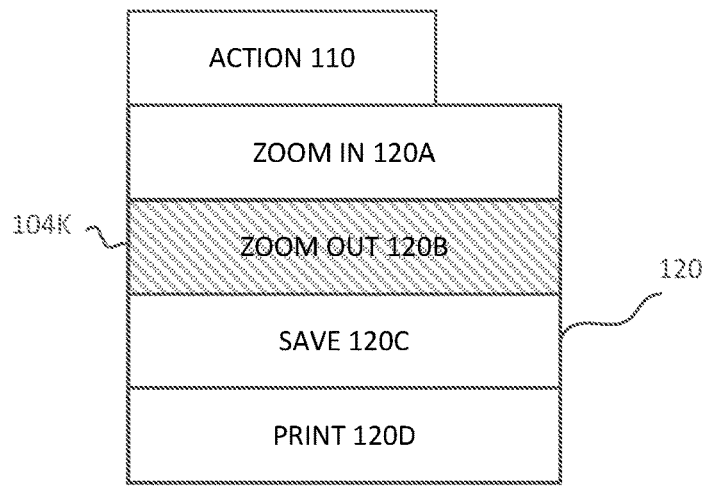
Figure 1L:
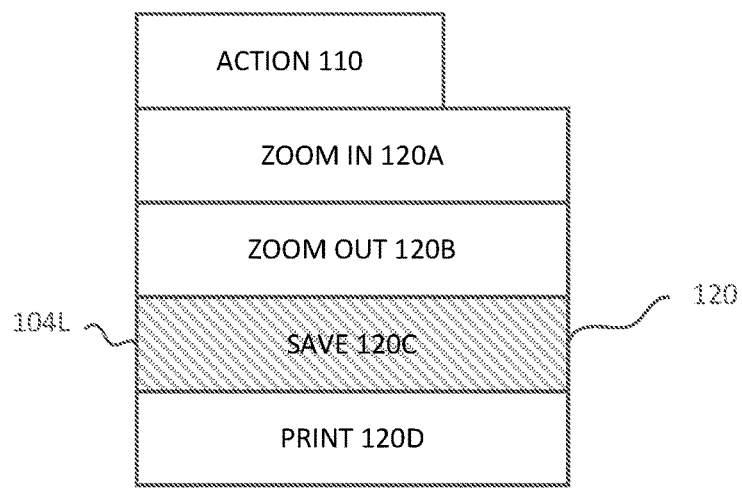
Figure 1M:
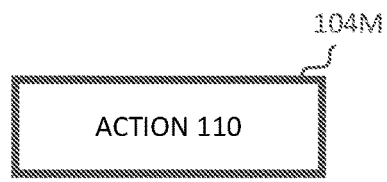

However, if user interactions other than mouse or touch are used to select any of the items 110, 120A-120D, a focus indicator is placed on the selected items as depicted in FIGS. 1I-1M. In this illustration, assume that the user interactions are arrow keys or tab keys of a keyboard. For example, a button 110 focuses when a keyboard user tabs to the button 110. The menu 120 launches, as depicted in FIG. 1I, when the user presses enter, space bar or the down arrow. When the down key is pressed, the menu option 120A has a focus indicator 104J, as depicted in FIG. 1J. For example, the menu option 120A may turn grey. When the down key is pressed again, the grey focus indicator 104J is removed from menu option 120A and a grey focus indicator 104K is applied to the next menu option 120B, as depicted in FIG. 1K. If the down key is pressed again, the grey focus indicator 104K is removed from menu option 120B and a grey focus indicator 104L is applied to the next menu option 120C, as depicted in FIG. 1L and so on as the down key is successively pressed. If the up key is pressed, then the focus indicator would reverse going upwards from menu option 120D, 120C, 120B to 120A and so on. When the keyboard's enter key is pressed while the focus indicator is on one of the menu options 120A-120D, the focus returns to the menu button 110, the menu 120 disappears, as depicted in FIG. 1M, and a focus indicator 104M is applied to the menu button 110.

Figure 1N:
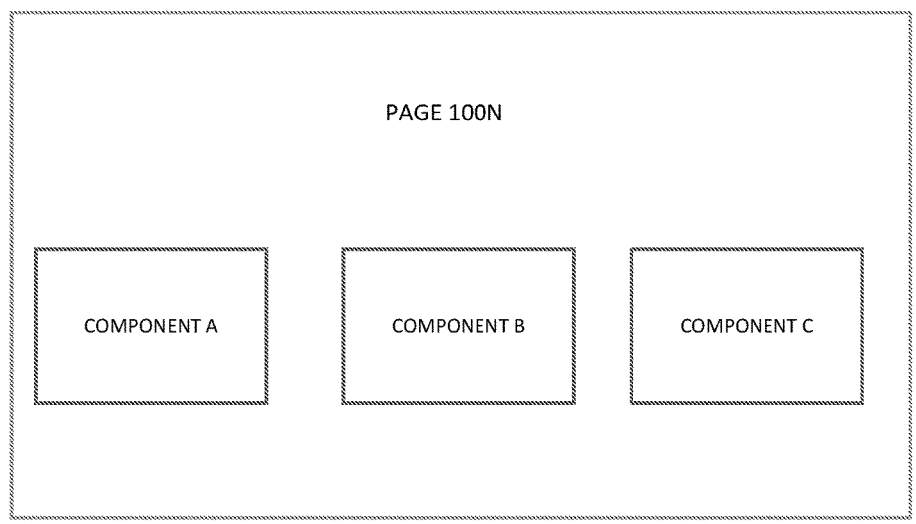
FIG. 1N depicts a block diagram of a displayed page that demonstrates focus behavior for one or more components, according to one embodiment.

FIG. 1N depicts a block diagram of a displayed page 100N that demonstrates focus behavior for one or more components, according to one embodiment. For example, page 100N is displayed on a display device and depicts components A, B, and C. According to one embodiment, the page 100N is a web page. However, embodiments are well suited to the page 100N being other types of pages. For example, the page 100N can be any type of page that displays user selectable components to which focus indicators can be applied.

Examples of components include at least buttons, drop down menus, menu buttons, radio buttons, check boxes, and data entry fields. The various buttons, menu buttons, menu options depicted in FIGS. 1A, 1B, 1E-1N are examples of components with focus behavior, according to various embodiments. Components provide a user with various types of controls. A component is also frequently referred to as an "element." A component may be any type of displayable, user selectable component to which a focus indicator can be applied. A user interface application can be used to generate and display one or more pages, such as page 100N. One or more of the pages can display one or more components.

FIGS. 1A-1N depicts various components that can be displayed on a display device using a user interface, according to various embodiments. Examples of a display device are any type of device that enables a user to see pages of a user interface. The display device may be a touch screen device or a non-touch screen device.

Various embodiments provide for different focus behaviors of the components depending on the type of user interaction with the components. For example, selected components demonstrate different focus behavior depending on whether they are selected using a type of interaction, such as mouse or touch, where the user knows what they selected or with some other type of interaction, such as an interaction involving keyboard, track ball, data glove, joy stick, verbal sensing devices, or eye motion detectors (also referred to as a second type of interaction). More specifically, if a component is selected by touching it or with a mouse, a focus indicator is not associated with the selected component. However, if the second type of interaction is used to select a component, then a focus indicator is displayed on the selected component. As will be seen, the type of focus behavior associated with a type of interaction is configurable.

If the second type of interaction is used to move from one component to another, then the focus indicator will be moved to the corresponding component. For example, assume that when page 100N is loaded, the focus indicator is initially associated with component A because it is the component that has focus upon page load. If the user presses a right arrow on their keyboard, the focus indicator will move from component A to component B. If the user presses the right arrow on their keyboard again, the focus indicator will move from component B to component C.

However, as discussed herein, if the user changes the type of interaction while selecting components, the focus behavior will change accordingly. For example, assume that the focus indicator is initially on component A when page 100N is loaded because component A has focus. Then, if the keyboard's right arrow is used to select component B after page 100N is loaded, the focus indicator will be removed from component A and applied to component B. If the user then presses component C with their finger or mouse, the focus indicator will be removed from component B and will not be associated with component C. If the keyboard's left arrow is then used to select component B, a focus indicator will be applied to component B. If the user selects component A with their finger or mouse, the focus indicator will be removed from component B and a focus indicator will not be applied to component A.

As can be seen in this illustration, the user changed their type of interaction from keyboard in selecting component B to mouse or touch in selecting component C. The user changed their type of interaction again from mouse or touch in selecting component C to keyboard in selecting component B again. The user changed their type of interaction yet again from keyboard in selecting component B to mouse or touch in selecting component A. In each case of transitioning, the focus behavior changed according to the type of interaction that was used for selecting respective components.

Although various embodiments are described in the context of a focus indicator, embodiments are well suited to other types of focus behavior. Embodiments are well suited to any type of focus behavior that can be applied to a component or that may indicate focus is associated with a displayed component, for example, because the component has been selected, the page has been loaded, or a dialog has suddenly been displayed without a user requesting it.

In contrast to various embodiments discussed herein, conventional frameworks either always provide focus indicators regardless of the type of device, type of platform or type of interaction or always dispense with focus indicators regardless of the type of device, type of platform, or type of interaction.

Framework

Figure 2:
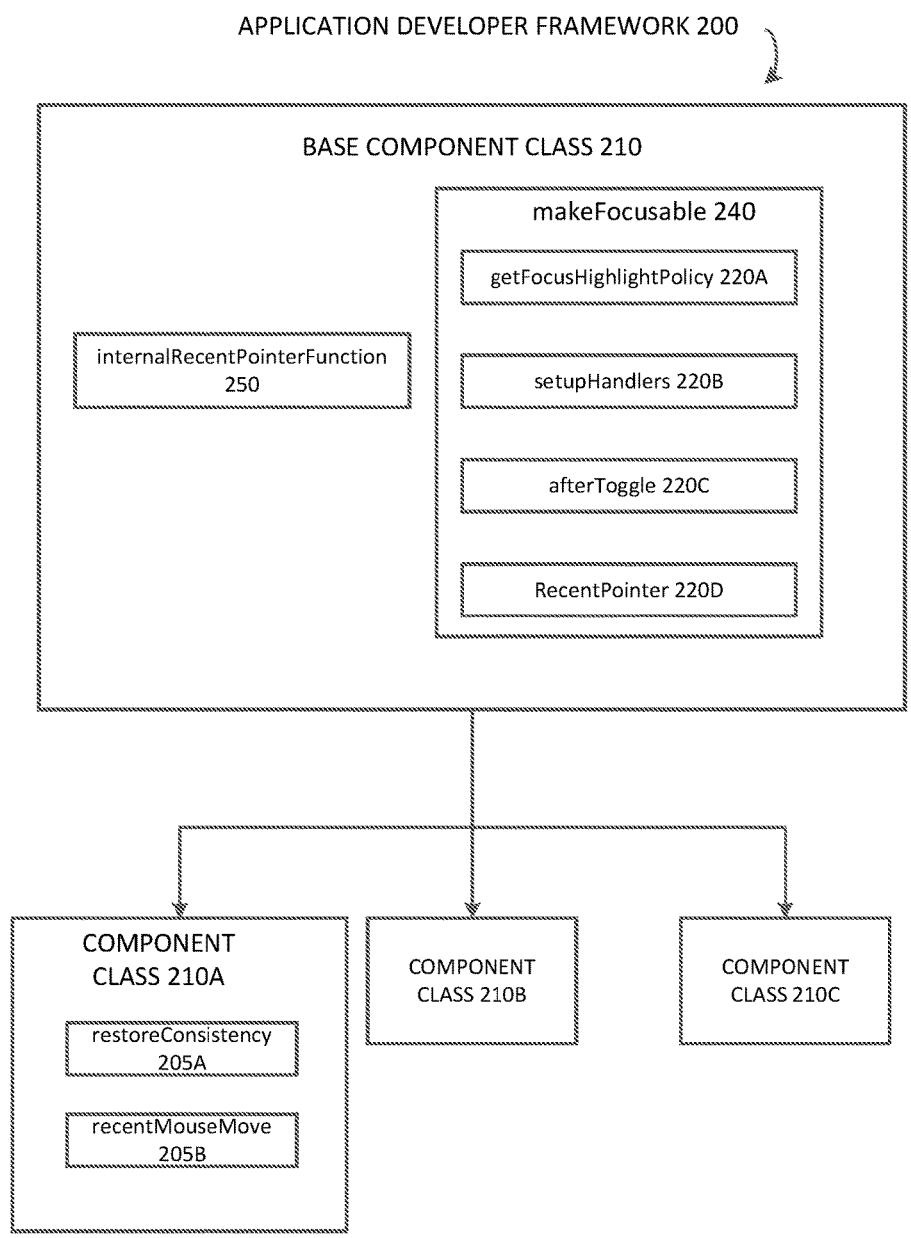
FIG. 2 depicts a block diagram of an application developer framework that provides a hierarchy of classes, according to one embodiment.

FIG. 2 depicts a block diagram of an application developer framework that provides a hierarchy of classes, according to one embodiment. An application developer can use the application developer framework 200 for creating a user interface application that provides focus behavior for a component of a page, according to various embodiments. More specifically, one focus behavior is to suppress or hide the focus indicator when the component is selected using touch or a mouse and another focus behavior is to apply the focus indicator to the component when the component is selected using any other type of interaction that is not mouse or touch. Other types of interaction include keyboard, track ball, data glove, joy stick, verbal sensing devices, eye motion detectors or a combination thereof.

The hierarchy of classes includes a base component class 210 and component classes 210A, 210B, 210C that are descendants of the base component class 210. As depicted, descendant component classes 210A, 210B, 210C are children of the base component class 210. However, various embodiments are well suited to there being any number of classes between the base component class 210 and the descendant component classes 210A, 210B, 210C. For example, various embodiments are well suited for one or more of the descendant component classes to be children, grandchildren, and great grandchildren and so on of the base component class 210. The descendant component classes could be a mix of children, grandchildren, great grandchildren and so on.

The base component class 210 provides an API called makeFocusable 240 and a method called internalRecentPointerFunction 250, according to one embodiment. According to one embodiment, the API makeFocusable 240 is a public method and internalRecentPointerFunction 250 is a private method. MakeFocusable 240 provides getFocusHighlightPolicy 220A, setupHandlers 220B, afterToggle 220C, and recentPointer 220D. GetFocusHighlightPolicy 220A, setupHandlers 220B, afterToggle 220C, and recentPointer 220D are function parameters. Callers of 220A-220D, such as descendant component class 210A, can pass values, such as functions 205A, 205B, to functions 220A-220B.

The descendent classes 210A, 210B, 210C inherit the application programming interfaces (APIs) and functions of the base component class 210. For example, the descendent classes 210A, 210B and 210C inherit the API makeFocusable 240. The descendent classes 210A, 210B, 210C can also specify additional methods, such as restoreConsistency 205A and recentMouseMove 205B.

According to one embodiment, the internalRecentPointerFunction 250 returns the value of true if a touchstart, touchend, mousedown, or mouseup event has occurred within the last N milliseconds, as will become more evident. According to one embodiment, the internalRecentPointer- Function 250 is used to determine whether to apply a focus indicator, as described herein.

A component class 210A-210C can (1) call makeFocusable 240 to sign up for the functionality of makeFocusable 240, (2) accept default functionality by not calling makeFocusable 240, or (3) tweak the functionality of makeFocusable 240 by passing in parameters for callback functions 220A-220D. The callback function recentPointer 220D can be passed to makeFocusable 240 to specify additional cases (e.g. mouseMove) to take into account, as discussed herein.

A component class can have callback functions, such as restoreConsistency 205A and/or recentMouseMove 205B, that it passes to makeFocusable 240. The callback functions restoreConsistency 205A and recentMouseMove 205B are optional. As depicted in FIG. 2, component classes 210B and 210C do not provide callback functions 205A or 205B. The callback function restoreConsistency 205A provides component specific consistency, according to one embodiment. The callback function recentMouseMove takes into account mouse movements, according to one embodiment.

According to various embodiments, a recent pointer activity is considered to have occurred if (a) a mouse button or finger has recently been down or up as detected by internalRecentPointerFunction 250, or (b) the optional callback recentPointer 220D returns true. Components wishing to additionally take into account recent pointer movements, such as touchend, touchstart, mousedown, mouseup, can supply a function that returns true if those movements have been detected.

The hierarchy of classes, according to one embodiment, can be provided by an application development framework 200, such as Oracle® JavaScript Extension Toolkit (JET). The publicly available document entitled "Oracle® JavaScript Extension Toolkit (JET) Developing Applications with Oracle Jet 2.0.1.0," E70323-01 dated April 2016, is hereby incorporated by reference as if set forth in full in this document for all purposes.

According to one embodiment, the application developer framework 200 is implemented in Javascript. However the application developer framework 200 can be implemented with other languages. These languages may be object oriented or not object oriented. Further, a combination of languages may be used. Therefore, one or more languages, such as at least Javascript, cascading style sheets (CSS), HyperText Markup Language, C++, C, Java, assembly language, etc. can be used.

According to various embodiments, an application development framework 200 is provided that can be used to build a wide variety of applications and provide general use. This single application developer framework 200, and the applications built using it, can target multiple platforms, including mobile hybrid applications, mobile web applications, and desktop web applications, with any combination of at least touch, mouse, and other types of input capabilities, such as keyboard, track ball, and so on, and have the correct focus highlight appear in all cases and for all usages. Thus, various embodiments provide an application development framework 200 that can be used to create a wide variety of applications.

This is in contrast with conventional mobile-only applications or conventional mobile only frameworks that dispense with focus indications altogether, or a desktop oriented application desktop framework that applies the focus indicator too often due to the lack of the embodiments described herein. In other words, conventional frameworks either always provide focus indicators regardless of the type of device, type of platform or type of interaction or always dispense with focus indicators regardless of the type of device, type of platform, or type of interaction.

The application developer framework 200 provides the "heavy lifting" in one centralized place, according to one embodiment, making it as easy as possible for application developers to access the functionality provided, for example, by the base component class 210, without engaging in complicated programming.

Various embodiments are well suited for providing different types of focus behavior depending on the type of platform. For example, although various embodiments are illustrated as suppressing or hiding focus indicator for mouse and touch while providing the mouse indicator for all other types of interactions, embodiments are also well suited for providing a focus indicator for either mouse or touch for one type of platform while not providing a focus indicator for either mouse or touch for a different type of platform. Further, the types of interactions that a focus indicator is provided for or not provided for is configurable, as discussed herein.

Although various embodiments are described in the context of several interfaces 220A-220D, 205A, 205B, various embodiments are well suited for fewer or more interfaces. For example, restoreConsistency 205A and recentMouseMove 205B are optional. Further, the functionality of two or more of the interfaces 220A-220D, 205A, and 205B could be combined. Further still, various embodiments are even well suited for using a single interface with various parameters to specify which functionality provided by the interfaces 220A-220D, 205A, 205B the developer intends.

For the sake of illustration, assume that component class 210A provides callback functions 205A and 205B while component classes 210B and 210C do not. For the sake of illustration, FIG. 2 depicts three component classes 210A-210C. However, embodiments are well suited for more or fewer component classes. According to one embodiment, there can be a descendant class of the base component class 210 for each type of component. For example, there may be one descendant component class for buttons, another descendant component class for menus, and so on.

Various embodiments have been described in the context of object oriented programming. For example, the application development framework 200 provides various classes as depicted in FIG. 2. Objects can be created using the classes. Creating of an object from a class is also commonly known as "instantiating." An object is also commonly known as an "instantiation" of the class it was created from.

An Exemplary System

Figure 3:
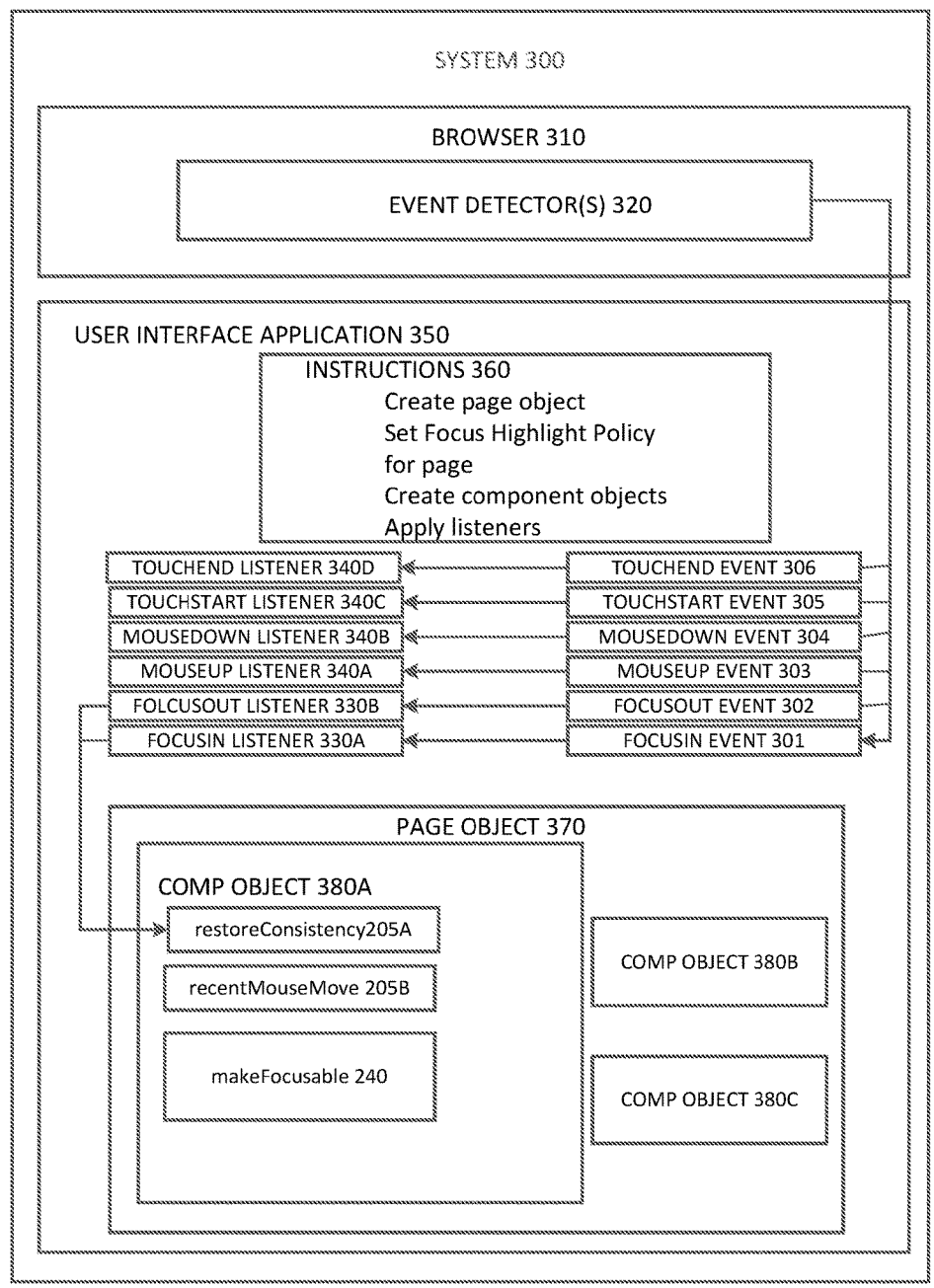
FIG. 3 depicts a block diagram of a system for providing focus behavior for a component of a page, according to one embodiment.

FIG. 3 depicts a block diagram of an exemplary system 300 for providing focus behavior for a component of a page, according to one embodiment.

The system 300 includes a browser 310 and a user interface application 350. The user interface application 350 is created at least in part using the application developer framework 200. The user interface application 350 may also include functionality other than that provided by the application developer framework 200. For example, the user interface application 350 may include modules, routines, APIs, functions, classes and so on that are not part of the application developer framework 200.

The browser 310 includes one or more event detectors 320 that generate various events. Examples of events include at least focusin event 301, focusout event 302, mouseup event 303, mousedown event 304, touchstart event 305, and touchend event 306.

The user interface application 350 includes instructions 360, a page object 370, component objects 380A, 380B, 380C and event listeners 330 and 340. For the sake of illustration, assume that page object 370 represents page 100N (FIG. 1N) and component objects 380A, 380B, 380C represent respective components A, B and C (FIG. 1N).

Although the page object 370 is depicted as including the component objects 380A-380C, various other types of associating component objects 380A-380C with the page object 370 can be used. Examples of associating the component objects 380A-380C with the page object 370 can include at least pointers, links, tables, and databases.

Examples of event listeners are focusin listener 330A, focusout listener 330B, mouseup listener 340A, mousedown listener 340B, touchstart listener 340C, and touchend listener 340D. Listeners 330A, 330B, 340A-304D are invoked respectively for events 301-306. Listeners 340A-340D are used by internalRecentPointerFunction 250, as discussed herein.

The application 350 can configure when the focusin event 301 and focusout event 302 occur. The focusin event 301 and focusout event 302 occur respectively when a component is focused or unfocused. Mousedown event 304 occurs when the mouse button is pressed down. Mouseup event 303 occurs when the mouse button is released. Touchstart event 305 occurs when the user initially touches the screen of their display device. Touchend event 306 occurs when the user ends their touch of the screen.

For the sake of simplicity, component objects 380B and 380C are not depicted with methods. However, since in this illustration, the component objects 380A, 380B, and 380C are instantiations of classes 210A, 210B, 210C that have class 210 as their base component class, each of the component objects 380A, 380B and 380C have inherited the methods from the base component class 210. This enables the component objects 380A-380C to interact independently of each other. For at least this reason, the components A-C do not have to be aware of each other in order to provide focus behavior, as discussed herein.

The instructions 360 are used to create the page object 370 and the component objects 380A-380C. The instructions 360 can also include one or more instructions to set a focus highlighting policy for the page 100N. The instructions 360 can apply listeners 340A-340D to the page 100N.

As depicted in FIG. 3, the focusin listener 330A and the focusout listener 330B communicate with the call back function, restoreConsistency 205A. The recentMouseMove 205B listens for mouse movement events that occur when the mouse is moved across the screen of the display device.

According to one embodiment, a mix of focus behaviors can be used for components on the same page or in the same user interface. For example, the application developer could write the user interface application to create a first object from a first class that is part of the application developer framework. The application developer could specify their own class that inherits from one of the classes 210, 210A-210C in the framework 200 where their own class overloads methods of one or more of framework's classes 210, 210A-210C that it inherits from. For example, the application developer can write their own class in a way that entirely changes, modifies or augments the base component class 210's focus behavior.

Various embodiments can be used across components of a page that may not know about each other, without any special coordination, for example, by instantiating component objects 380A-380C that each inherit functionality from a base component class 210. For example, consider a button that launches a popup menu. If the user selects the menu item from the menu, the menu dismisses and focus returns back to the button. The button will not have a focus indicator if the menu item was selected using mouse or touch. Otherwise, the button will have a focus indicator. Since the component objects inherit functionality from the base component class 210, this type of functionality is provided automatically, without the button and the menu components knowing about each other, or doing any type of setup or coordination.

The user interface application 350 can be implemented in Javascript. However the application 350 can be implemented with other languages. These languages may be object oriented or not object oriented. Further, a combination of languages may be used. Therefore, one or more languages, such as at least Javascript, cascading style sheets (CSS), HyperText Markup Language, C++, C, Java, assembly language, etc. can be used.

Processor readable instructions, according to various embodiments, are used to implement at least the user interface application 350 and the framework 200. The processor readable instructions can reside in hardware memory and can be executed by one or more digital processors that are part of one or more digital computers.

According to various embodiments, an application developer can use an application development framework 200, as described herein, as a part of writing the user interface application 350, as discussed herein.

Although listeners 340-340D, 330A and 330B are described as being outside of a class, the listeners 340A-340B could be part of a class. For example, the listeners 340A-340D, 330A and 330B could be implemented as methods or functions of a page class that is used to instantiate a page object 370. The page class may or may not be a part of the application developer framework 200.

Although objects 380A, 380B and 380C are described as being instantiations of classes 210A, 210B, and 210C that are part of the application developer framework 200, embodiments are well suited for one or more of the objects 380A-380C to be instantiations of other classes. For example, one or more of the objects 380A-380C may be instantiations of the base component class 210 or instantiations of a class outside of the framework 200 that inherits from either the base component class 210 or one or more of the descendent classes 210A-210C. For example, the classes that are outside of the framework 200 may overload various interfaces 220A-220D, 240, 205A, 205B to entirely change, modify or augment functionality, in a manner understood by one of ordinary skill in the art.

User Interactions

Various types of electronic devices, non-device implements, or parts of a person's body can be used for user interactions. Examples of parts of a user's body include at least the user's finger, the user's hand, the user's voice, and the user's eyes. Examples of electronic devices include at least a keyboard, a mouse, a joy stick, track ball, data glove, eye movement tracking devices, and verbal command determining devices. A device is at least partially hardware, according to one embodiment. For example, a device may be entirely hardware, hardware and software, hardware and firmware, a combination of hardware, software and firmware, among other things. An example of a non-device implement is a stylus that can be used to touch a component displayed on a display device. Examples of a display device are a touch screen device and a non-touch screen device.

The electronic device may be a pointing device. Examples of pointing devices are at least a mouse, track ball, data glove, joy stick, eye movement tracking device, and verbal command determining device. Pointers may or may not be devices. Examples of pointers that are devices include at least mouse, touch screen, trackball, data glove, joy stick, eye movement tracking device, and verbal command determining device. Examples of pointers that are not devices include at least a finger, voice, hand, eyes, and a stylus.

A user interaction with respect to component, results in generation of a device signal. For example, selecting a component using a keyboard results in the keyboard generating a device signal. In another example, a touch screen device generates a device signal when a user touches the visual representation of the component with their finger or a stylus displayed on the touch screen device. In another example, an eye movement racking device generates a device signal in response to eye movement. In still another example, a verbal command determining device generates a device signal in response to verbal commands. Similarly, other types of user interactions involving electronic devices, non-device implements, part of the human body, pointing devices, and pointers result in device signals being generated. The device signals can be used to determine the type of event that is generated.

Certain types of interactions enable the user to typically know which component has been selected. For example, the user will typically know which component is selected when using touch or mouse. A user can touch a component using a part of their body, such as their finger, or a touch implement, such as a stylus.

Certain types of user interactions with components are prone to error. For example, using a keyboard to interact with components is prone to error because the user may not know which component was selected. The user may accidentally press a key more times than they thought or accidentally press a different key than they intended. There are other types of situations where the user will not have control of which component is selected, and, therefore, benefit from applying a focus indicator to a component. Examples of these types of situations include when a page is initially loaded and when a dialog is suddenly displayed that was not requested by the user. Further, a focus indicator showing the component that is currently selected is beneficial for making the page accessible to keyboard users, particular those who use a keyboard due to a physical inability that makes using pointing device, their hand or their finger, among other things, difficult.

Although various embodiments are described in the context of not applying a focus indicator to a component selected with mouse or touch and providing a focus indicator when another type of interaction is used to select a component, various embodiments are well suited for applying or not applying a focus indicator differently. For example, if an application developer decides to provide the same type of behavior for track ball as for touch or mouse, then the user interface application 350 can be configured with track ball listeners in a similar manner that it can be configured with the mouse listeners 340A, 340B and touch listeners 340C, 340D, as discussed herein.

These are just a few examples of how the user interface application 350 can be configured with listeners for one or more types of interactions. Therefore, continuing this example, the user interface application 350 can be configured to not provide focus indicators when mouse, touch or trackball is used, according to one embodiment.

Various embodiments even support the less-common case where an auxiliary keyboard, such as a Bluetooth keyboard, is used to interact with a mobile device, such as a tablet. For example, when the user interacts with a keyboard to select components displayed on a mobile device's screen, a focus indicator is displayed with the selected component and moved to newly user selected components. However, when the user selects components displayed on the mobile device's screen without the keyboard, the focus indicator is suppressed or hidden as discussed herein. As with a desktop keyboard, various embodiments provide the focus indicator for keyboard navigation, but not for mouse or touch interaction. Hiding or suppressing the focus indicator for mouse or touch interactions improves the attractiveness of any application built using a framework, as discussed herein.

Exemplary Application Programming Interfaces

Various embodiments provide for one or more application programmer interfaces (APIs). Examples of the application programmer interfaces are getFocusHighlightPolicy 220A, setupHandlers 220B, afterToggle 220C and recentPointer 220D.

Various embodiments provide for consistency and/or other per component focus. For example, consider the situation where a developer wants the "default" CSS class to be applied if and only if no "state" or classes such as "focus" or "hover" are applied. The developer can use the afterToggle 220C to specify a callback function, such as restoreConsistency 205A, which will be called each time after the focus classes have been added or removed, as discussed herein. In this case, the restoreConsistency 205A is notified whether the classes were added or removed. Consistency or other requirements can be enforced, for example, in a call back function, such as restoreConsistency 205A.

The getFocusHighlightPolicy 220A allows developers to supply a "focus highlight policy" for added flexibility, for example, as discussed herein. The policy indicates for which focuses the focus highlight policy will be applied. The default is "nonPointer", with the semantics described herein. GetFocusHighlightPolicy can also return "all" or "none", indicating that the "focus-highlight" class will be applied for all or no focuses, respectively. "All" effectively opts out of the enhanced behavior, while "none" allows the application to assume responsibility for applying the focus indicator (perhaps by applying the "focus-highlight" class manually) at the appropriate times. According to one embodiment, the getFocusHighlightPolicy 220A is called for every focus, thus, enabling a component to dynamically change the policy, for example, in response to other states of the component.

According to one embodiment, the recentPointer parameter 220D can be used to specify additional conditions in which pointer activity is considered to be recent. For example, component 380A can pass the callback function recentMouseMove 205B to that parameter. RecentMouseMove 205B can use a mousemove listener to determine whether recent mouse movements have occurred, in much the same way that listeners 340A-340D are used by internalRecentPointerFunction 250 to determine if events 303-306 have recently occurred. In this example, the callback function passed to recentPointer 220D is recentMouseMove 205B, which returns true if the listener has detected a mousemove in the last N ms, as discussed herein. Otherwise, the callback function returns false. Then the focus-highlight class can be applied, as discussed herein.

The recentPointer 220D can be used to specify an optional "recent pointer" callback function, such as recentMouseMove 205B, for added flexibility. For example, if the developer wants to take into account not only touchstart, touchend, mousedown, and mouseup, but also, for example, mousemove events, in determining whether there has been recent pointer activity, then the developer can use the recentPointer 220D to specify the call back function, recentMouseMove 205B, and those additional mousemove events.

As discussed herein, a focus indicator is hidden or suppressed when a component is selected using mouse or touch. Therefore, events 303 and 304 and corresponding listeners 340A and 340B are used as part of determining that a component was selected using a mouse. Further, events 305 and 306 and corresponding listeners 340C and 340D are used to determine if a component was selected using a touch.

The setupHandler 220B can be used to specify the focusin listener 330A and the focusout listener 330B, as discussed herein. Thus, setupHandler 220B can arrange for the specified listeners, such as focusin listener 330A and focusout listener 330B, to be called in response to events that the developer chooses. For example, as discussed herein, the focusin listener 330A can apply the cascading style sheets, such as "focus" CSS class and "focus-highlight" CSS class under appropriate circumstances, as discussed herein, and the focusout listener 330B can remove those classes.

The setupHandlers 220B can be used to specify events other than focusin or focusout, at which the focus classes will be added or removed. This enables developers to use "logical focus" rather than literal browser focus, such as a toolbar widget where only the toolbar itself gets real browser focus, and its individual buttons are "logically focused" via arrow-key navigation or pointer interaction. SetupHandlers 220B makes functions available where the functions know how to add and remove classes under appropriate situations. Examples of classes that can be added and removed, as discussed herein, are the "focus" CSS class and "focus-highlight" CSS class.

Various embodiments support the less-common case involving communications between an auxiliary keyboard, such as a Bluetooth keyboard, and a mobile device, such as a tablet. Therefore, according to one embodiment, a focus indicator is not applied to components displayed on a mobile device when those components are selected using touch or mouse. However, according to one embodiment, a focus indicator is applied to components displayed on the mobile device when those components are selected, for example, using another type of interaction, such as a Bluetooth keyboard.

Threshold

If the most recent of the events 303-306 occurred less than the threshold N milliseconds (ms) ago, then, according to one embodiment, the interaction by mouse or touch is considered recent. In this case, the "focus-highlight" CSS class is not applied to the selected component. Otherwise, the "focus-highlight" CSS class is applied to the selected component.

If the most recent of the events to have occurred is the touchend event 306, the mousedown event 304, or the mouseup event 303, then the threshold N is 600 ms, according to one embodiment. This threshold N has been experimentally verified to work well on a variety of platforms. According to various embodiments. The threshold N of 600 ms is referred to as "the lower threshold N."

If the most recent of the events to have occurred is the touchstart event 305, then the threshold N is 750+600=1350 ms, so that the focus set by a 750 ms pressHold gesture is recognized as touch-related. The same 600 ms padding can be used for the other events 303, 304, and 306. The threshold N of 1350 ms is referred to as "the higher threshold N."

Since, according to various embodiments, the touchstart event 305, which uses the higher threshold N of 1350 ms, is followed by a mousedown event 304, which uses the lower threshold N of 600 ms, it is ensured that when a mousedown event 304 follows a touchstart event 305, processing does not result in a shortening of the time period during which a focus will be considered to be touch related.

Thus, the higher threshold N has been set higher for touchstarts so that focuses resulting from a standard 750 ms long press (e.g., launching and focusing a popup context menu on longpress) can be correctly detected. The higher threshold does not lead to false positives for ordinary tap interactions, because in that case the touchstart event 305 is quickly followed by a touchend event 306 with the lower threshold, for example.

As can be seen, both the lower threshold N and the higher threshold N have been experimentally calibrated to avoid both false negatives and false positives on a variety of platforms.

Configuring

Various embodiments provide for configuring the focus behaviors, the listeners and corresponding events provided by the user interface application 350. For example, although various embodiments have been illustrated using listeners 340A-340D, 330A, 330B, events 301-306, the "focus" CSS class and "focus-highlight" CSS, embodiments are well suited for different configurations. Therefore, the user interface application 350 can be configured by changing, for example, the focus behaviors, the listeners and corresponding events provided. The configuring can involve adding or removing focus behaviors, listeners and corresponding events, using fewer focus behaviors, changing the implementation of the focus behaviors and listeners, or using different focus behaviors and listeners, as discussed herein.

As discussed herein, the recentPointer 220D can be used to specify an optional "recent pointer" callback function, such as recentMouseMove 205B, for added flexibility.

The setupHandlers 220B can be used to specify events other than focusin or focusout, at which the focus classes will be added or removed. For example, setupHandlers 220B could be used to specify mousein and mouseout instead of or in addition to focusin and focusout.

Various embodiments are well suited for other listeners, depending on the type of user interaction, using different CSS classes to provide different appearances and behaviors of components.

Further, fewer, additional or different thresholds can be used. For example, an additional threshold could be used for an additional user interaction. More specifically, one or more additional thresholds may be used to configure focus behavior for any one or more of trackball, data glove, joy stick, eye movement tracking device, and verbal command determining device. In another example, if different user interactions are employed, then the threshold may be changed to suit the new user interaction.

Exemplary Methods

As discussed herein, conventionally, the focus behavior is the same regardless of the type of user interaction with component. Therefore, conventionally, the focus behavior is not determined based on a type of user interaction with the component. More specifically, conventional frameworks either always provide focus indicators regardless of the type of device, type of platform or type of interaction or always dispense with focus indicators regardless of the type of device, type of platform, or type of interaction.

In contrast, various embodiments, at least as discussed in flowcharts 400-700 and in other portions of the specification and the attached drawings, provide at least for different types of focus behaviors for different types of user interactions with a component.

Figure 4:
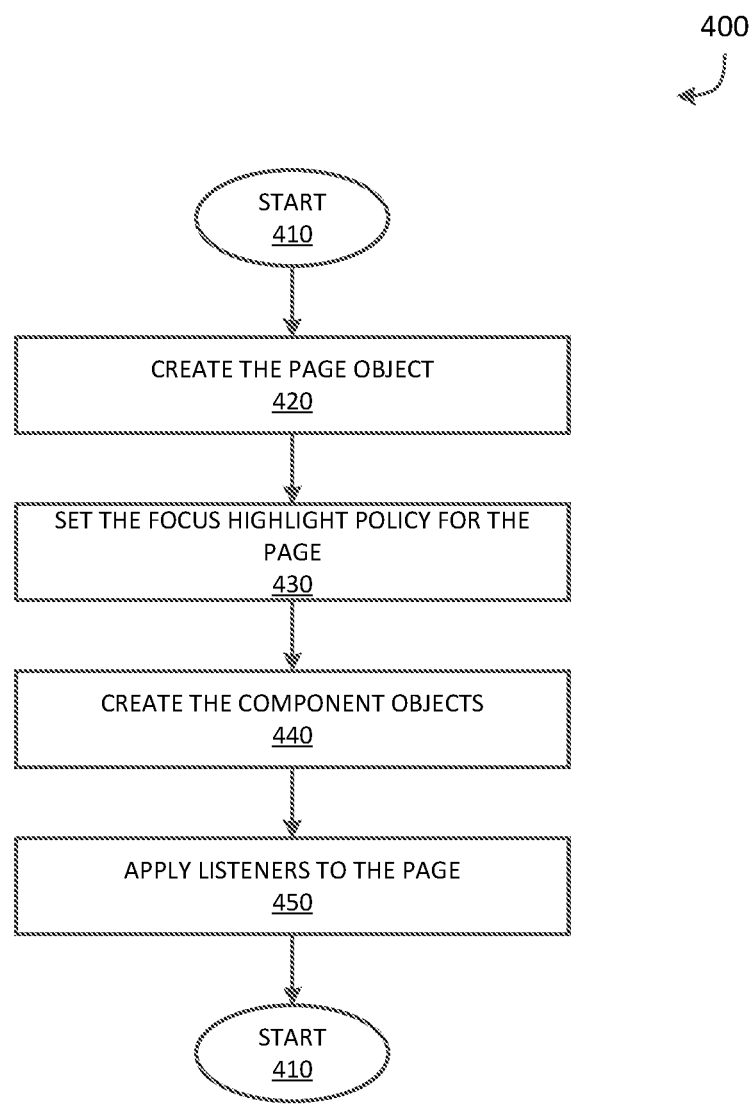
FIG. 4 depicts a flowchart of a method performed by processor readable instructions, according to one embodiment.

FIG. 4 depicts a flowchart 400 of a method performed by processor readable instructions 360.

At 410, the method begins.

At 420, the processor readable instructions 360 create the page object 370. For example, the processor readable instructions 360 can create the page object 370 from a page class that may or may not be a part of the framework 200. In another example, the application 350 may have its own page class (referred to herein as "application page class"). The application page class may or may not inherit from a page class in the framework 200.

At 430, the processor readable instructions 360 set the focus highlight policy for the page 100N, as discussed herein.

At 440, the processor readable instructions 360 create the component objects 380A-380C. For example the component objects 380A, 380B, and 380C can be instantiations of the respective component classes 210A, 210B, and 210C.

At 450, the processor readable instructions 360 apply the listeners 340A-340D to the page 100N. For example, the listeners 340A-340D are applied to the page 100N during the capture phase to ensure hearing all of the corresponding events 303-306 that may occur anywhere on the page 100N. The listeners 340A-340D are applied statically, instead of per component or per subsystem, according to one embodiment. As discussed herein, these listeners 340A-340D set a timestamp indicating when the latest corresponding event 303-306 was noted.

The timestamp approach avoids the risk of processing being stuck in an inaccessible state. For example, consider an approach that uses a "pointer" state (in which focus indicators are not shown) instead of using a timestamp on touchstart or mousedown and that leaves that state on touchend or mouseup. If the touchend event or mouseup event is never detected for some reason, perhaps because it was consumed by another event listener, then the application will incorrectly remain in the pointer state. In this case, the focus highlight is not shown for subsequent keyboard focuses.

At 460, the method ends.

Figure 5:
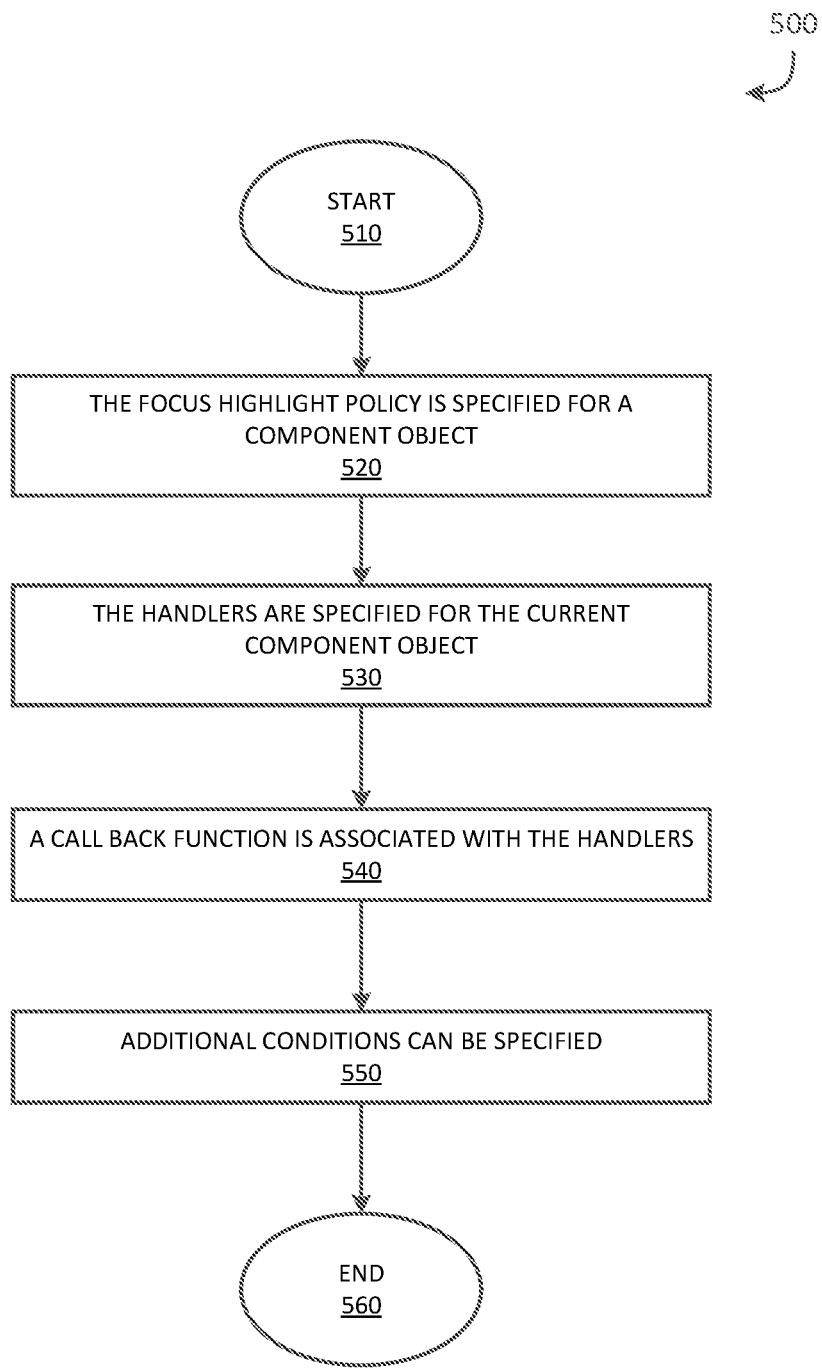
FIG. 5 depicts a flowchart of a method performed by each of the component objects, according to one embodiment.

FIG. 5 depicts a flowchart 500 of a method performed by each of the component objects 380A-380C, according to one embodiment. The method of flowchart 500 can be performed, for example, when the respective component objects 380A-380C are created at 440.

At 510, the method begins.

At 520, the focus highlight policy is specified for a component object. For example, each caller (i.e., each component) of makeFocusable 240 can optionally pass a callback function to the getFocusHighlightPolicy parameter 220A (also referred to as getFHP) to use a different policy. Assume in this illustration that component object 380A is the caller. GetFHP 220A can pass its own callback function to the getFocusHighlightPolicy parameter 220A of makeFocusable 240 to specify its own policy. GetFHP 220A returns 1 of 3 enumerated values, as discussed herein. A component's own policy can differ from the page's policy.

At 530, the handlers are specified for the current component object. For example, the component object that is currently being instantiated can specify the handlers by calling setupHandlers 220B. In this illustration, the handlers are focusin listener 330A and focusout listener 330B, which can be specified as parameters of setupHandlers API 202.

At 540, a call back function is associated with the handlers by calling afterToggle 220C. More specifically in this illustration, the call back function, restoreConsistency 205A, can be associated with the focusin listener 330A and the focusout listener 330B. The listeners 330A and 330B communicate with restoreConsistency 205A upon being invoked respectively for the focusin event 301 and the focusout event 302.

At 550, additional conditions can be specified. For example, the recentPointer parameter 220D can be used to specify additional conditions, as discussed herein.

At 560, the method ends.

Various embodiments are well suited for using other types of events, event listeners and call back functions depending on the type of user interaction and focus behavior that the developer of the user interface application wants to implement. For example, various functions, APIs, routines, modules, and so on, as discussed herein, can be called with different parameters to specify different types of events, event listeners and call back functions.

Figure 6:
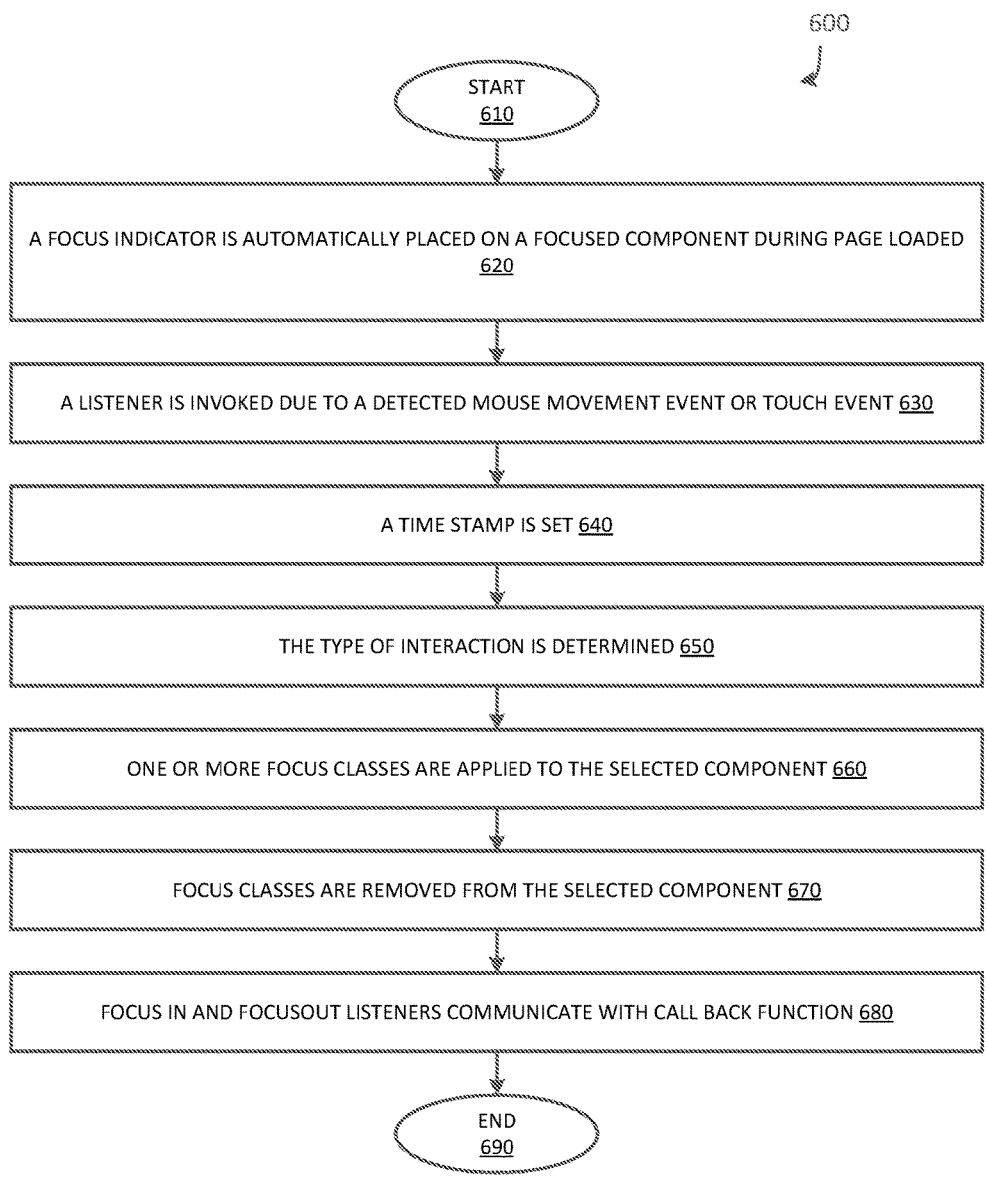
FIG. 6 depicts a flowchart for a method of providing focus behavior for a component of a page, according to one embodiment.

FIG. 6 depicts a flowchart for a method of providing focus behavior for a component of a page, according to one embodiment.

In operation 610, the method begins.

In operation 620, a focus indicator is automatically placed on a focused component during loading of the page 100N. Referring to FIG. 1N, assume for the sake of illustration that the focus indicator is placed on component A as part of the page 100N being loaded because focus is associated with component A.

In operation 630, a listener 340A-340D is invoked due to a corresponding event 303-306 is detected, as discussed herein In operation 640, the timestamp is set. In this illustration, assume that the mousedown listener 340B is invoked due to a mousedown event 304 as part of selecting a component, such as component B (FIG. 1N). Then the mousedown listener 340B sets the timestamp. Similarly, if the interaction had resulted in one of the other events 303, 305, 306, the respective mouseup listener 340A, touchstart listener 340C or touchend listener 340D would set the timestamp, as discussed herein.

In operation 650, the type of interaction is determined. For example, when a component, such as component B (FIG. 1N), is focused, the browser generates the focusin event 301. As one of ordinary skill in the art understands, the application 350 can be setup for the condition that causes focus. The focusin listener 330A receives the focusin event 301. As a result of the focusin event 301, internalRecentPointerFunction 250 determines if the interaction was a mouse or touch interaction. The internalRecentPointerFunction 250 can use the timestamp set in operation 640 to determine the amount of time that has elapsed since the timestamp was set by the mousedown listener 340B and return the value of true if the amount of elapsed time is less than the threshold N. If the interaction was a mouse or touch interaction, the amount of elapsed time will be less than the threshold N. Thus, the internalRecentPointerFunction 250 can be used to determine if the interaction was performed using a mouse or touch by returning a value of true if the amount of elapsed time since timestamp was set in operation 640 is less than the threshold N.

Any type of page that is initially loaded or a dialog that is suddenly displayed without being requested by the user will also result in the amount of time since the timestamp was set being greater than the threshold N, according to one embodiment. Therefore, internalRecentPointerFunction 250 will return false when any type of page is initially loaded or when a dialog is displayed that was not requested by the user.

In operation 660, one or more focus classes are applied to the selected component. For example, the focusin listener 330A, according to one embodiment, applies the "focus" CSS class for all types of interactions and applies the "focus-higlight" CSS class if the interaction is touch or mouse. If internalRecentPointerFunction 250 returns the value of true, in operation 650, to the focusin listener 330A, then the interaction is by touch or mouse.

In operation 670, focus classes are removed from the selected component. For example, the browser 310 generates the focusout event 302 when a component loses focus. Continuing the illustration, component B (FIG. 1N) is the component that loses focus. The focusout listener 330B receives the focusout event 302 and removes both the "focus" CSS class and the "focus highlight" CSS class from component B.

In optional operation 680, according to one embodiment, the focusin listener and the focusout listener communicate with a callback function. For example, the focusin listener 330A and the focusout listener 330B can call restoreConsistency 205A to provide other types of processing for consistency and/or other per component focus, as discussed herein.

At operation 690, the method ends.

While the page 100N is displayed, operations 630-680 can be repeatedly performed as the user interacts with components on a page and components are selected to determine whether to apply a focus indicator to the selected components.

Figure 7:
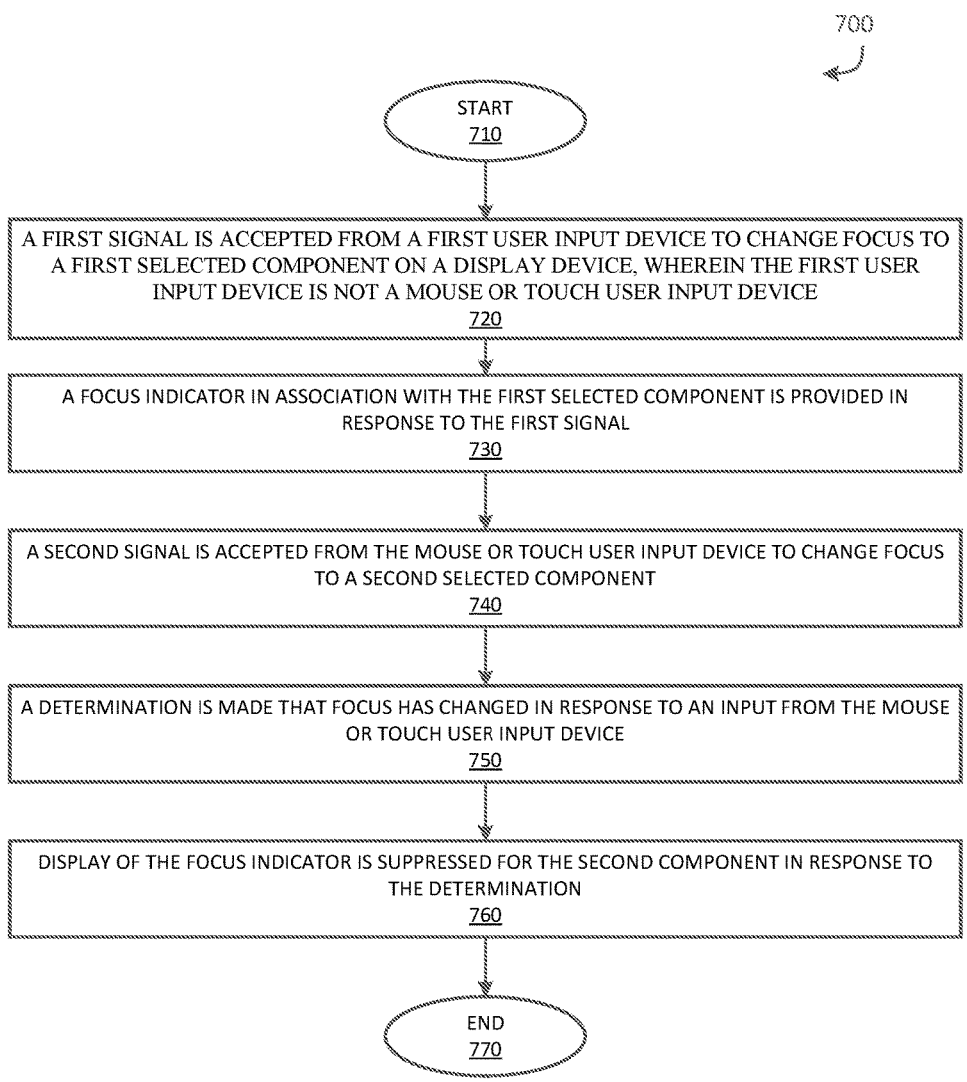
FIG. 7 depicts a block diagram of a flowchart of a method for implementing focus indication of components displayed on a display device, the display device coupled to one or more processors and to a plurality of user input devices, according to one embodiment.

FIG. 7 depicts a block diagram of a flowchart 700 of a method for implementing focus indication of components displayed on a display device, the display device coupled to one or more processors and to a plurality of user input devices, according to one embodiment.

In this illustration, examples of the plurality of user input devices are a keyboard device, a mouse device, and touch screen device. Examples of a display device that is coupled to one or more processors are any type of display device that can display pages of a general user interface. The display device may or may not be a touch screen device.

At 710, the method begins.

At 720, a first signal is accepted from a first user input device to change focus to a first selected component on a display device, where the first user input device is not a touch screen or a mouse device. In this example, it shall be assumed that the first user input device is a keyboard. An initial user interaction with a component of the page is detected. According to one embodiment, an initial user interaction is the beginning of a user interaction with the component. A user interacts with the page 100N in a manner that generates a mouseup event 303, mousedown event, 304, touchstart event 305 or a touchend event 306, as discussed herein. The listener 340A-340D that corresponds with the generated event 303-306 sets a timestamp, as discussed herein. A focusin event 301 is generated as a part of the initial user interaction. The focusin listener 330A detects the focusin event 301. Embodiments are well suited to using different listeners than the focusin listener 330A. For example, embodiments are well suited to using mousein instead of focusin. A focusout event or a mouseout event, among others, can be used to determine when the user interaction ends.

Assume in this illustration that component A in FIG. 1N has focus in response to the page 100N being loaded. Assume in this illustration that component B is the first user selected component on the display device that a first signal is accepted for from a keyboard to change focus. Therefore, the focus has changed from component A to component B and a timestamp was generated for the initial user interaction with component B, as discussed herein.

In response to the detecting of the initial user interaction with a component, such as component B, a type of user interaction with a component of the page is determined. For example, if the amount of time since the timestamp was set, due to one of the events 303-306, is less than threshold N, as discussed herein, the type of user interaction is mouse or touch. If the amount of time since the timestamp was set is greater than threshold N, then the type of user interaction is not mouse or touch. As discussed herein, internalRecentPointerFunction 250 returns true if the type of user interaction is either mouse or touch and returns false if the type of user interaction is not mouse or touch.

In this illustration, the first signal is for keyboard so the internalRecentPointerFunction 250 returns false.

As discussed herein, various embodiments are well suited for providing determinations for other types of interactions, depending on how the application is configured. For example, the application may be configured so that internalRecentPointerFunction 250 returns true for other types of user interaction, such as at least trackball, as discussed herein.

A focus behavior is determined based on the type of user interaction. Continuing the example, if internalRecentPointerFunction 250 returns true, then the focus behavior is either mouse or touch. However, if internalRecentPointerFunction 250 returns false, then the focus behavior is neither mouse nor touch.

At 730, a focus indicator in association with the first selected component is provided in response to the first signal. Continuing this illustration, it was determined that the interaction was for a user input device that is neither mouse nor touch. In this case, the focus indicator is applied to the component B that the user currently selected. The focus indicator can be applied to the component B by applying the "focus-highlight" CSS class.

According to one embodiment, applying a focus indicator is one type of focus behavior and not applying a focus indicator is another type of focus behavior.

At 740, a second signal is accepted from a mouse or touch user input device to change focus to a second selected component. Examples of a mouse or touch user input device are a mouse device or a touch screen device.

An initial user interaction with a component of the page is detected, as discussed herein, and a time stamp is generated, as discussed herein. Assume for the sake of illustration that the second selected component is component C depicted in FIG. 1N.

In response to the detecting of the initial user interaction with component C, a type of user interaction with component C is determined. For example, if the amount of time since the timestamp was set, due to one of the events 303-306, is less than threshold N, as discussed herein, the type of user interaction is mouse or touch.

At 750, a determination is made that focus has changed in response to an input from a mouse or touch user input device. In this case, internalRecentPointerFunction 250 returns true, indicating that the focus behavior is either mouse or touch. Continuing the illustration, the focus behavior has changed from keyboard for selecting component B to mouse or touch for selecting component C.

At 760, display of the focus indicator is suppressed (also known as "hidden") for the second selected component in response to the determining at 750. For example, if the interaction is either mouse or touch, the focus indicator is not applied to the component that the user currently selected. More specifically, the focus indicator can be hidden or suppressed by not applying the "focus-highlight" CSS class. In this illustration, display of the focus indicator is suppressed for component C.

At 770, the method ends.

Different types of focus behavior are associated with different types of user interactions. For example, one type of user interaction involves mouse and touch. Another type of user interaction involves neither mouse nor touch. According to one embodiment, it is not difficult for a user to know where they are (also referred to as "not error prone") if the type of user interaction is mouse and touch. In this case, a focus indicator is not provided. According to one embodiment, it is difficult for the user to know where they are (also referred to as "error prone") if a type of user interaction is not mouse or touch. In this case, a focus indicator is provided. A focus indicator helps a user to know if a displayed component is relevant, helps the user to know what element their user interactions will interact with, for example, by helping them know what component their keys, such as tab keys, will move the focus to. According to one embodiment, user interactions may be moved between the types depending on whether they are deemed error prone or not error prone. For example, if trackball is deemed to not be error prone, for example as the result of experimentation, a focus indicator may not be provided. According to one embodiment, the first type of user interaction is mouse or touch and the second type of user interaction is not mouse or touch. Examples of a first type of user interaction include at least mouse or touch. Examples of a second type of user interaction are any type of interaction that is not in the first type of user interaction. Examples of a second type of user interaction include at least keyboard, track ball, data glove, joy stick, verbal sensing devices, or eye motion detectors.

According to various embodiment, the mouse or touch user input device is selected from a group consisting of mouse device and touch screen device.

According to various embodiments, the focus indicator is selected from a group consisting of ring, outline, box, rectangle, frame, color, bolding, pattern, dotted outline, background color, highlight, font change, animation, shading, inside the component, and outside of the component.

According to one embodiment, the method further comprises: determining an amount of time since a most recent event; if the amount of time is within a threshold, then a type of user interaction with a component is a first type of user interaction; and otherwise, the type of user interaction is a second type of user interaction. For example, a listener 340A-340D sets a timestamp indicating when the latest corresponding event 303-306 was noted. The internalRecentPointerFunction 250 can use the timestamp to determine the amount of time that has elapsed since the timestamp was set by the listener 340A-340D. The amount of time that has elapsed can be used to determine if the type of user interaction is the first type or the second type, as discussed herein.

According to one embodiment, the threshold is in a range of 600 to 1350 milliseconds, as discussed herein. According to one embodiment, the method further comprises determining the threshold, as discussed herein. According to one embodiment, as discussed herein, the determining of the threshold further comprises: using a first threshold if the most recent event is in a first set of events; and using a second threshold if the most recent event is in a second set of events, wherein the first threshold is smaller than the second threshold. According to one embodiment, the first set of events includes a touchend event, a mousedown event, and a mouseup event and the second set of events includes a touchstart event. According to one embodiment, as discussed herein, the first threshold is 600 milliseconds and the second threshold is 1350 milliseconds.

According to one embodiment, as discussed herein, determining a focus behavior based on a type of user interaction with a particular component of a displayed page by; determining a first focus behavior for a first type of user interaction; and determining a second focus behavior for a second type of user interaction. According to one embodiment, as discussed herein, the first focus behavior is a focus indicator, as discussed herein.

According to one embodiment, as discussed herein, in response to a focusin event with respect to the particular component, if the type of user interaction is neither mouse nor touch, then applying a "focus-highlight" cascading style sheet class to the particular component; and otherwise, not applying the "focus-highlight" cascading style sheet class to the particular component. For example, assume that the browser 310 fires a focusin event 310 for component, such as component B. In response to a focusin event 301 for the component B, the focusin listener 330A can apply the "focus-highlight" CSS class to the component B if the interaction is neither mouse nor touch; otherwise, the "focus-highlight" CSS class is not applied to the component B.

According to one embodiment, in response to a focusin event with respect to a particular component, applying a "focus" cascading style sheet class to the particular component; and applying a "focus-highlight" cascading style sheet class to a particular component if a focus of the particular component did not occur within a threshold of a last detected mouse event or touch event. An example of a focusin event is focusin event 301 depicted in FIG. 3. The focusin listener 330A can apply a "focus" cascading style sheet class to a particular component for all cases; and the focusin listener 330A can apply a "focus-highlight" cascading style sheet class to the particular component if a focus of the particular component did not occur within a threshold of a last detected mouse event or touch event. The threshold could be a lower threshold N of 600 ms or a higher threshold N of 1350 ms, as discussed herein.

According to one embodiment, as discussed herein, in response to a focusout event with respect to the component, removing the "focus" cascading style sheet class and the "focus-highlight" cascading style sheet class from the particular component. For example, the browser 310 generates the focusout event 302 when a component loses focus, as discussed herein. The focusout listener 330B receives the focusout event 302 and removes both the "focus" CSS class and the "focus highlight" CSS class from component B.

According to one embodiment, as discussed herein, detecting a first user interaction with respect to one of a plurality of components of a displayed page; determining a type of the first user interaction; determining a first focus behavior based on the type of the first user interaction; providing the first focus behavior with respect to the one of the plurality of the components; detecting a second user interaction with respect to a different one of the plurality of components of the displayed page; determining a type of the second user interaction; determining a second focus behavior based on the type of the second user interaction; and providing the second focus behavior with respect to the different one of the plurality of the components. For example, assume that when page 100N is loaded, the focus indicator is initially associated with component A because component A is in focus. If the user presses a right arrow on their keyboard, the focus indicator will move from component A to component B. If the user presses the right arrow on their keyboard again, the focus indicator will move from component B to component C. However, if the user presses on component B with their finger or mouse, after page 100N is loaded, the focus indicator will be removed from component A and a focus indicator will not be associated with component B. Further, when the user presses component C with their finger or mouse, a focus indicator will not be associated with component C. This is just one example of detecting a user interaction, determining the type of user interaction, determining a focus behavior and providing that focus behavior. Embodiments are well suited for providing other examples, as discussed herein. Instead of using arrow keys, tab and shift-tab can be used respectively to move focus forward or backward.

According to one embodiment, as discussed herein, the first focus behavior and the second focus behavior are same type of focus behavior. For example, if component B is selected using touch or mouse, followed by selecting component C with touch or mouse, then a focus indicator will not be applied to either component B or component C. In another example, if component B is selected using arrow keys on a keyboard followed by selecting component C using arrow keys, then a focus indicator will be applied in succession to component B and component C as the arrow keys are used.

According to one embodiment, as discussed herein, the first focus behavior and the second focus behavior are different types of focus behavior and wherein the method further comprises: transitioning between applying the first focus behavior and the second focus behavior to selected components of the displayed page depending on respective types of user interactions with respect to the selected components For example, assume that the focus indicator is initially on component A when page 100N is loaded because component A is in focus. Then, if the keyboard's right arrow is used to select component B after page 100N is loaded, the focus indicator will be removed from component A and applied to component B. If the user then presses component C with their finger or mouse, the focus indicator will be removed from component B and will not be associated with component C. If the keyboard's left arrow is then used to select component B, a focus indicator will be applied to component B. If the user selects component A with their finger or mouse, the focus indicator will be removed from component B and a focus indicator will not be applied to component A.

In this illustration, the user changed their type of interaction from keyboard in selecting component B to mouse or touch in selecting component C. The user changed their type of interaction again from mouse or touch in selecting component C to keyboard in selecting component B again. The user changed their type of interaction yet again from keyboard in selecting component B to mouse or touch in selecting component A. In each case of transitioning, the focus behavior changed accordingly.

These are just a few examples of transitioning between applying a first focus behavior and applying a second focus behavior. As can be seen, various embodiments provide for transitioning any time one component is selected using a first type of user interaction, such as mouse or touch, followed by selecting another component using a second type of user interaction that is not either mouse or touch, or vice versa.

According to one embodiment, as discussed herein, applying a focus indicator to a particular component in response to a non-pointer-event, wherein the non-pointer-event is selected from a group consisting of user keyboard, initial load of a displayed page that depicts the particular component, and a dialog depicting the particular component, wherein the dialog is not requested by a user, as discussed herein.

An Exemplary Apparatus

FIG. 8 depicts a block diagram of an apparatus for implementing focus indication of components displayed on a display device, according to one embodiment. According to one embodiment, the apparatus 800 resides in the user interface application 350.

The apparatus 800 can include a first user input device signal acceptor 801, mouse or touch device signal acceptor 802, a focus behavior determiner 803, a focus indicator provider 804, and a focus indicator suppressor 805. The first user input device signal acceptor 801 accepts (720) a first signal from a first user input device to change focus to a first selected component on a display device. The focus indicator provider 804 provides (730) a focus indicator in association with the first selected component in response to the first signal. The mouse or touch device signal acceptor 802 accepts (740) a second signal from a mouse or touch user input device to change focus to a second selected component. The focus behavior determiner 803 determines (750) that focus has changed in response to an input from the mouse or touch user input device. The focus indicator suppressor 805 suppresses (760) display of a focus indicator for the second selected component in response to determining that the focus has changed.

Therefore, according to one embodiment, an apparatus comprising: one or more processors; and logic encoded in one or more tangible media for execution by the one or more processors and when executed operable to: detect an initial user interaction with a component of a page; in response to detection of the initial user interaction, determine a type of the user interaction with the component of the page; determine a focus behavior based on the type of the user interaction, wherein different types of focus behavior are associated with different types of user interactions; and provide the focus behavior with respect to the component.

According to one embodiment, the one or more processors are hardware processors. According to one embodiment, the one or more processors are digital processors. According to one embodiment, the processor-readable storage device is tangible. The one or more processors of the apparatus 800 are digital hardware processors, as discussed herein.

An Exemplary Tangible Processor-Readable Storage Device

Various embodiments provide a tangible processor-readable storage device including instructions executable by a digital processor, the tangible processor-readable storage device including one or more instructions for: detecting an initial user interaction with a component of a page; in response to the detecting of the initial user interaction, determining a type of the user interaction with the component of the page; determining a focus behavior based on the type of the user interaction, wherein different types of focus behavior are associated with different types of user interactions; and providing the focus behavior with respect to the component.

Unless otherwise specified, any one or more of the embodiments described herein can be implemented using processor readable instructions which reside, for example, in tangible processor-readable storage device of a computer system or like device. The tangible processor-readable storage device can be any kind of physical memory that instructions can be stored on. Examples of the tangible processor-readable storage device include but are not limited to a disk, a compact disk (CD), a digital versatile device (DVD), read only memory (ROM), flash, and so on. As described above, certain processes and operations of various embodiments of the present invention are realized, in one embodiment, as a series of processor readable instructions (e.g., software program) that reside within tangible processor-readable storage device of a computer system and are executed by one or more digital processors of the computer system. When executed, the instructions cause a computer system to implement the functionality of various embodiments of the present invention. For example, the instructions can be executed by a digital processor, such as a central processing unit, associated with the computer system. The tangible processor-readable storage device is hardware memory and the one or more digital processors are hardware processors.

Unless otherwise specified, one or more of the various embodiments described in the context of FIGS. 1A, 1B, 1D-8 can be implemented as hardware, such as circuitry, firmware, or processor readable instructions that are stored on tangible processor-readable storage device. The processor readable instructions of the various embodiments described in the context of FIGS. 1A, 1B, 1D-8 can be executed by a one or more digital processors to cause a computer system to implement the functionality of various embodiments.

CONCLUSION

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

The illustrations herein are only provided by way of example and not by way of limitation. For example, there are other ways of performing the methods described by flowcharts 400-700 and various operations described herein.

The operations depicted in FIGS. 1A, 1B, 1D-7 can be implemented as processor readable instructions, as described herein. According to one embodiment, a system 300 or apparatus 800 can perform one or more of the operations depicted or described in the context of FIGS. 1A, 1B, 1D-7.

The operations depicted in FIGS. 4-7, or described herein, transform data or modify data to transform the state of computer system. For example, the state of the computer system and data are transformed or modified from providing the same focus behavior regardless of the type of user interaction to providing different types of focus behavior based on the type of interaction with displayed components. In another example, the computer system and data are transformed or modified by applying a focus indicator to a first component that is selected using a first type of interaction, such as mouse or touch, and not applying a focus indicator to a second component that is selected with a second type of interaction that is mutually exclusive with the first type of interaction.

Although the description has been described with respect to particular embodiments thereof, these particular embodiments are merely illustrative, and not restrictive. For example, numerous variations are described herein.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for implementing focus indication of components displayed on a display device, the display device coupled to one or more processors and to a plurality of user input devices, the method comprising the following performed by the one or more processors:
   accepting a first signal from a first user input device to change focus to a first selected component on the display device, wherein the first user input device is not a mouse or touch user input device;
   providing a focus indicator in association with the first selected component in response to the first signal;
   accepting a second signal from the mouse or touch user input device to change focus to a second selected component;
   determining that focus has changed in response to an input from the mouse or touch user input device; and
   suppressing display of a focus indicator for the second selected component in response to the determining.

2. The method as recited by claim 1, wherein the mouse or touch user input device is selected from a group consisting of mouse device and touch screen device.

3. The method as recited by claim 1, wherein the focus indicator is selected from a group consisting of ring, outline, box, rectangle, frame, color, bolding, pattern, dotted outline, background color, highlight, font change, animation, shading, inside the component, and outside of the component.

4. The method as recited by claim 1, wherein the method further comprises:
   determining an amount of time since a most recent event;
   if the amount of time is within a threshold, then a type of user interaction with a component is a first type of user interaction; and
   otherwise, the type of user interaction is a second type of user interaction.

5. The method as recited by claim 4, wherein the threshold is in a range of 600 to 1350 milliseconds.

6. The method as recited by claim 4, wherein the method further comprises:
   determining the threshold.

7. The method as recited by claim 6, wherein the determining of the threshold further comprises:
   using a first threshold if the most recent event is in a first set of events; and
   using a second threshold if the most recent event is in a second set of events, wherein the first threshold is smaller than the second threshold.

8. The method as recited by claim 7, wherein the first set of events includes a touchend event, a mousedown event, and a mouseup event and the second set of events includes a touchstart event.

9. The method as recited by claim 7, wherein the first threshold is 600 milliseconds and the second threshold is 1350 milliseconds.

10. The method as recited by claim 1, wherein the method further comprises:
    determining a focus behavior based on a type of user interaction with a particular component of a displayed page by;
    determining a first focus behavior for a first type of user interaction; and
    determining a second focus behavior for a second type of user interaction.

11. The method as recited by claim 10, wherein the first focus behavior is a focus indicator.

12. The method as recited by claim 11, wherein the method further comprises:
    in response to a focusin event with respect to the particular component,
    if the type of user interaction is neither mouse nor touch, then applying a "focus-highlight" cascading style sheet class to the particular component; and
    otherwise, not applying the "focus-highlight" cascading style sheet class to the particular component.

13. The method as recited by claim 1, wherein the method further comprises:
    in response to a focusin event with respect to a particular component,
    applying a "focus" cascading style sheet class to the particular component; and
    applying a "focus-highlight" cascading style sheet class to the particular component if a focus of the particular component did not occur within a threshold of a last detected mouse event or touch event.

14. The method as recited by claim 13, wherein the method further comprises:
    in response to a focusout event with respect to the component, removing the "focus" cascading style sheet class and the "focus-highlight" cascading style sheet class from the particular component.

15. The method as recited by claim 1, wherein the method further comprises:
    detecting a first user interaction with respect to one of a plurality of components of a displayed page;
    determining a type of the first user interaction;
    determining a first focus behavior based on the type of the first user interaction;
    providing the first focus behavior with respect to the one of the plurality of the components;
    detecting a second user interaction with respect to a different one of the plurality of components of the displayed page;

determining a type of the second user interaction;
determining a second focus behavior based on the type of the second user interaction; and
providing the second focus behavior with respect to the different one of the plurality of the components.

16. The method as recited by claim 15, wherein the first focus behavior and the second focus behavior are same type of focus behavior.

17. The method as recited by claim 15, wherein the first focus behavior and the second focus behavior are different types of focus behavior and wherein the method further comprises:
transitioning between applying the first focus behavior and the second focus behavior to selected components of the displayed page depending on respective types of user interactions with respect to the selected components.

18. The method as recited by claim 1, wherein the method further comprises:
applying a focus indicator to a particular component in response to a non-pointer-event, wherein the non-pointer-event is selected from a group consisting of user keyboard, initial load of a displayed page that depicts the particular component, and a dialog depicting the particular component, wherein the dialog is not requested by a user.

19. An apparatus comprising:
one or more processors; and
logic encoded in one or more tangible media for execution by the one or more processors and when executed operable to:
accept a first signal from a first user input device to change focus to a first selected component on a display device, wherein the first user input device is not a mouse or touch user input device;
provide a focus indicator in association with the first selected component in response to the first signal;
accept a second signal from a mouse or touch user input device to change focus to a second selected component;
determine that focus has changed in response to an input from a mouse or touch user input device; and
suppress display of a focus indicator for the second selected component in response to determining that the focus has changed.

20. A non-transitory processor-readable storage device including instructions executable by a digital processor, the tangible processor-readable storage device including one or more instructions for:
accepting a first signal from a first user input device to change focus to a first selected component on a display device, wherein the first user input device is not a mouse or touch user input device;
providing a focus indicator in association with the first selected component in response to the first signal;
accepting a second signal from a mouse or touch user input device to change focus to a second selected component;
determining that focus has changed in response to an input from a mouse or touch user input device; and
suppressing display of a focus indicator for the second selected component in response to the determining that the focus has changed.

* * * * *

UNITED STATES PATENT AND TRADEMARK OFFICE
CERTIFICATE OF CORRECTION

PATENT NO. : 10,191,610 B2
APPLICATION NO. : 15/241882
DATED : January 29, 2019
INVENTOR(S) : Evans It is certified that error appears in the above-identified patent and that said Letters Patent is hereby corrected as shown below:

In the Specification

Column 13, Line 65, delete "platforms," and insert -- platforms. --, therefor.

Column 13, Line 66, delete "embodiments. The" and insert -- embodiments, the --, therefor.

Column 16, Line 41, delete "herein" and insert -- herein. --, therefor.

Column 21, Lines 48-49, delete "components" and insert -- components. --, therefor.

Signed and Sealed this
Twenty-first Day of January, 2020

Andrei Iancu
*Director of the United States Patent and Trademark Office*